United States Patent [19]

Takahashi et al.

[11] 4,365,002
[45] Dec. 21, 1982

[54] COATED PLASTIC FILMS

[75] Inventors: Shigeyuki Takahashi; Shozo Yamamoto, both of Amagasaki; Nagayoshi Tsukane, Himeji, all of Japan

[73] Assignee: Daicel Chemical Industries Ltd., Osaka, Japan

[21] Appl. No.: 274,438

[22] Filed: Jun. 17, 1981

[30] Foreign Application Priority Data

Jun. 25, 1980 [JP] Japan ................................. 55-87183

[51] Int. Cl.$^3$ ...................... B05D 3/02; B32B 27/08; B32B 27/42; B37B 23/08
[52] U.S. Cl. ................................. 428/483; 427/389.9; 427/393.5; 427/322; 427/324; 428/508; 428/510; 428/516; 428/518; 428/520; 428/524; 428/526; 428/527; 428/475.8

[58] Field of Search ................. 427/389.9, 393.5, 391, 427/322, 324; 428/508, 510, 516, 518, 520, 483, 527, 514, 524, 526, 475.8

[56] References Cited

U.S. PATENT DOCUMENTS

| | | | |
|---|---|---|---|
| 3,251,817 | 5/1966 | Hahn et al. ..................... | 428/508 X |
| 3,560,250 | 2/1971 | Brandt et al. ................... | 428/527 X |
| 3,637,431 | 1/1972 | Brenneman et al. ........... | 428/514 X |
| 4,282,060 | 8/1981 | Maslanka et al. .............. | 427/391 X |

*Primary Examiner*—Michael R. Lusignan
*Attorney, Agent, or Firm*—Hubbell, Cohen, Stiefel & Gross

[57] ABSTRACT

A coated plastic film possessing good printability slip properties, oxygen and moisture barrier properties and transparency which comprises applying to a plastic film a coating solution of a thermoplastic resin as base resin in which a synthetic resin of a network structure having a softening temperature above 100° C. and being in the form of a fine powder are added, and drying thereafter.

17 Claims, No Drawings

COATED PLASTIC FILMS

BACKGROUND OF THE INVENTION

1. Field of the Invention

This invention relates to a coated plastic film, and more particularly, to a coated plastic film having good printability, slip properties, oxygen and moisture barrier properties and transparency.

2. Description of the Prior Art

It is well known to coat a regenerated cellulose, biaxially oriented polypropylene, polyethylene terephtharate, nylon 6 or like film with a composition comprising mainly a resin such as a vinylidene or vinyl chloride copolymer to provide it with oxygen and moisture barrier properties. The coated film is suitable as packaging film material, and used after its coated surface is printed, or otherwise treated. The printing and other treatment of the coated film essentially requires its high slip properties. Therefore, it is usual practice to mix a fine powder in the coating solution.

The fine powder of kaolin, silica, bentonite, calcium carbonate, or the like is usually mixed in the coating solution. These inorganic fine powders can be used, whether the coating solution is a solution prepared with an organic solvent, or an aqueous dispersion. In addition to these inorganic fine powders, it has been proposed to use a fine powder of polystyrene as shown in Japanese Patent Publication No. 8452/73, a fine powder of polyethylene as in Japanese Patent Application Laid-Open No. 2942/71, and a fine powder of polystyrene or polyvinyl chloride as in Japanese Patent Application Laid-Open No. 99638/74. These powders of synthetic resins can, however, be used only when the coating solution is an aqueous dispersion. If the coating solution is a solution prepared by an organic solvent, the addition of any such synthetic resin powder is hardly expected to improve the slip properties of the coated film, since the powder is considerably swollen or dissolved by an organic solvent.

The printing of a packaging film is in most cases done by photogravure. Photogravure is the most suitable process for reproducing a special tone of a color photograph, depending on the depth and area of the cells on a gravure plate. If the cells have a depth of 5 to 15 microns, pinholes (unprinted portions) are likely to appear in the printed surface layer on the coated plastic film on which printing has been made, if the coating liquid contains a fine powder of an inorganic substance such as kaolin, silica, bentonite or calcium carbonate.

The inventors of this invention have looked into the cause of those pinholes, and found that they are due to surface conditions of the coated film to be printed i.e., projections existing on the coated surface. They have found that those projections are formed if the coating solution contains a fine powder of an inorganic substance such as kaolin, silica, bentonite or calcium carbonate. Accordingly, they have conducted printing tests by selecting fine powders having a relatively small average particle diameter, but encountered a limitation to the reduction in the particle diameter of any such powder, since the particle diameter must be greater than the thickness of the coating on the film in order to improve its slip and anti-blocking properties. Moreover, those inorganic fine powders contain particles having a diameter which is by far greater than the average diameter of the powder as a result of agglomeration. These particles form large projections on the coated surface, and give rise to pinholes when printing is made thereon. Therefore, it has been difficult to obtain a coated film having good printability leaving no pinhole in the printed surface layer thereof, while maintaining its excellent slip and anti-blocking properties.

SUMMARY OF THE INVENTION

As a result of their repeated research efforts to solve the problems hereinabove pointed out, the inventors have achieved this invention by discovering that if a coating solution containing a fine powder of a synthetic resin which does not agglomerate, and is hardly soluble in an organic solvent is used, it is possible to obtain a coated plastic film having good printability, slip and anti-blocking properties, oxygen and moisture barrier properties, and transparency, whether the coating solution may be a solution prepared with an organic solvent, or may be an aqueous dispersion.

According to this invention, there is, thus, provided a coated plastic film possessing good printability, slip properties, oxygen and moisture barrier properties and transparency, which comprises applying to a plastic film a coating solution of a thermoplastic resin as a base resin in which 0.01-2 parts by weight of a synthetic resin of a network structure having a softening temperature above 100° C. and being in the form of a fine powder of an average particle diameter of 1-20 microns are added for 100 parts by weight of said thermoplastic resin, and drying thereafter.

DETAILED DESCRIPTION OF THE PREFERRED EMBODIMENTS

In order to obtain a coated surface having good slip and anti-blocking properties, and printability without having any pinhole, it is important that if the coating solution is a solution prepared with an organic solvent, a fine powder of a synthetic resin which is hardly soluble in the organic solvent and does not agglomerate should be uniformly distributed in a coating, and project from the surface of the dry coating. The fine powder of a synthetic resin employed by this invention satisfies these requirements.

According to this invention, the fine powder of a synthetic resin of the crosslinked network structure having a softening temperature above 100° C., and which is insoluble in an organic solvent include a crosslinked acrylic copolymer, a crosslinked styrene copolymer, a crosslinked vinyl chloride copolymer, and a benzoguanamine-formaldehyde condensate.

It is also possible to use a mixture of two or more kinds of said fine powder of the synthetic resins.

The crosslinked acrylic copolymer may be a copolymer of the three-dimensional structure comprising mainly a monomer component represented as $CH_2=CHCOOR_1$ or $CH_2=CCH_3COOR_2$, in which $R_1$ and $R_2$ each stand for hydrogen or an alkyl group having 1 to 4 carbon atoms, or a mixture thereof. These crosslinked synthetic resins can be obtained if 0.5 to 5% by weight of a monomer, such as glycidyl acrylate, glycidyl methacrylate, allyl acrylate or allyl methacrylate, are added during polymerization.

It is advisable for this invention to use the fine powder of a synthetic resin having a proportion of at least 90% by weight, and preferably at least 95% by weight which is insoluble in an organic solvent. For evaluation purposes, the fine powder is dispersed in the solvent to be used, e.g. methyl ethyl ketone, toluene, tetrahydrofurone, acetone, ethyl acetate or the like, the dispersion is heated at a temperature of 45° C. to 75° C. for about one hour and then cooled, and the undissolved particles are separated by ultracentrifuging and weighed. The coated plastic film obtained by using such a fine powder of a crosslinked synthetic resin is not only good in slip properties at room temperature, but also maintains its excellent slip properties at a high temperature. The fine powder may have an average particle diameter of 1 to 20 microns, and preferably 2 to 15 microns. The average particle diameter which is greater than the coating thickness is required for providing high slip and anti-blocking properties. Any average particle diameter above 20 microns is, however, inappropriate, since it is likely to have an undesirable effect on printability.

The coating solution, which contains mainly a thermoplastic resin, may contain 0.01 to 2.0, and preferably 0.05 to 0.5 parts by weight of the fine powder of a synthetic resin for 100 parts by weight of the thermoplastic resin. Although printability is not appreciably affected by any shortage or excess of the fine powder, the use of more than 2.0 parts by weight is likely to exert an undesirable effect on oxygen and moisture barrier properties, while the addition of any quantity below 0.01 part by weight is less effective in improving slip and anti-blocking properties.

It is, of course, advantageous to prepare a dispersion of the fine powder in a solvent for a coating solution by a homomixer, attritor, sand mill, or the like, and incorporate it into the coating solution. It is also effective to employ some excess of the fine powder, disperse it in a solvent, leave the dispersion at rest for several minutes, and incorporate the supernatant into the coating solution. This method, however, requires a sufficient number of preliminary tests for standardization in order to ensure that a coating solution of stabilized quality can be obtained at any time. In order to obtain a coated film of high transparency, it is, of course, advantageous to employ a fine powder having a refractive index which is close to that of the thermoplastic resin which the coating solution mainly contains.

The thermoplastic resin may be selected from among those known in the art for coating a packaging film, for example, a vinylidene chloride copolymer, a vinyl chloride copolymer, an acrylic copolymer, a vinyl acetate copolymer, and a mixture thereof. It is preferable to use a vinylidene chloride copolymer, since it provides oxygen and moisture barrier properties. The acrylic copolymer may be a copolymer containing mainly a monomer component represented as $CH_2=CHCOOR_1$ or $CH_2=CCH_3COOR_2$, in which $R_1$ and $R_2$ each stand for hydrogen or an alkyl group having 1 to 4 carbon atoms, or a mixture thereof. The coating solution used for this invention may be a solution of such a thermoplastic resin in a solvent such as toluene, tetrahydrofurone, methyl ethyl ketone, ethyl acetate, acetone or methyl isobutyl ketone, or a mixture thereof, or an aqueous dispersion of such a resin. Accordingly, it is possible to use the fine powder of any synthetic resin of the network structure that is almost insoluble in any such solvent as hereinabove mentioned. The coating solution can, of course, further contain a wax, an antistatic agent, a plasticizer, an ultraviolet absorbent, a stabilizer, or the like, as is known in the art.

The base for the coated plastic film according to this invention includes, for example, a film of a polyolefin such as polyethylene, polypropylene, polybutene or poly-4-methylpentene-1, a polyamide such as nylon 6, nylon 66 or nylon 12, a polyester such as polyethylene terephthalate or polyethylene terephthalate/isophthalate, a vinyl polymer such as polyvinyl chloride, polystyrene or polyacrylonitrile, or a polycarbonate, or a copolymer thereof, or a cellulosic resin such as cellulose acetate or regenerated cellulose. It is particularly preferable to use a biaxially oriented film in view of its mechanical properties and transparency. The base film can, of course, contain an additive of additives, such as an antistatic agent, a lubricant, a plasticizer, an anti-blocking agent and a pigment.

Various methods are known for treating the surface of the base film to improve the adhesion of the coating thereto. It is very effective for the purpose of this invention, too, to employ those methods for the treatment of the film surface by corona discharge, high frequency, flame or a chromic acid mixture, and apply an adhesion improver thereto.

According to this invention, of course, the coating solution may be applied to either one side of the base film, or both sides thereof. A dip coater, Meyer bar coater, gravure coater, roll coater, air-knife coater, or the like may be used for applying the coating solution, depending on the coated film to be manufactured. The coated plastic film may have a dry coating thickness of preferably 1 to 10 microns, and more preferably 2 to 5 microns.

The invention will now be described more specifically with reference to examples thereof, which are merely illustrative of this invention, and not limitative. The various properties of the coated plastic film were examined as follows:

Anti-blocking properties:

Several 100 mm square pieces of coated plastic film were sandwiched between a pair of glass plates, left to stand at a temperature of 40° C. and a pressure of 0.5 $kg/cm^2$ for eight hours, and allowed to cool to room temperature. Then, the film was examined, and its anti-blocking properties were determined in accordance with the following criteria:

Excellent: No force was required for separating the individual pieces of film from one another;

Acceptable: The film pieces could be separated if a small amount of force was applied; or Unacceptable: Although the film pieces could be separated if force was applied, the coating partially peeled off the base.

Moisture permeability:

It was determined at a temperature of 40° C. and a relative humidity of 90% by means of a cup of the type as specified by Z-0208 of JIS (Japanese Industrial Standard).

Oxygen permeability:

It was determined by gas chromatography at 20° C. by using a Lysay gas permeability testing apparatus L-66, oxygen gas having a humidity of 0%, and helium as a compensating gas.

Slip properties:

A coefficient of dynamic friction was obtained in accordance with the method as specified by D1894-63 of ASTM.

Transparency:

It was inspected visually, and the results were classified in accordance with the following criteria:

Excellent: Perfectly transparent;

Acceptable: Slightly whitish; or

Unacceptable: White, and not transparent.

Printability:

It was evaluated in terms of the degree of pinhole formation. The coated surface was printed by photogravure, and the printed surface was examined. The printability was determined in accordance with the following criteria:
Excellent: Hardly any pinhole was observed;
Acceptable: Some pinholes were observed; or
Unacceptable: A lot of pinholes were observed.

EXAMPLES 1 TO 3

A surface of a biaxially oriented polypropylene film having a thickness of 20 microns was subjected to corona discharge treatment, and obtained a water contact angle of 75°. Coronate L (product of Japan Polyurethane Co.) was applied onto the treated surface of the film by a gravure coater to form a layer having a unit weight of 0.2 g/m² thereon, and it was dried at 110° C. for 10 seconds. Then, a coating solution of the composition hereinafter shown at A was applied to the film surface by Meyer bar coater, and dried at 105° C. for 15 seconds.

The coated surface of the film was, then, printed with GNC inc (nitrocellulose/polyamide ink of Toyo Ink Co., Japan) by a gravure roll with a gravure plate having a cell depth of 7 microns, and the printed surface was dried at 110° C. for five seconds.

The properties of the coated plastic film obtained as hereinabove described, and the results of the printing tests conducted thereon as hereinabove described are shown in TABLE 1 below.

| (A) Coating solution | |
|---|---|
| Vinylidene chloride-vinyl chloride (88:12) copolymer resin | 100 parts by weight |
| Wax (m.p. 78° C.) | 1.5 parts by weight |
| Fine powder of a crosslinked acrylic resin (Rohm & GmbH Plex 4885F having an average particle diameter of 10 microns) | 0.15 parts by weight |
| Methyl ethyl ketone | 260 parts by weight |
| Toluene | 260 parts by weight |

COMPARATIVE EXAMPLES 1 TO 3

The procedures of EXAMPLES 1 to 3 were repeated for the manufacture of coated plastic films, except that a fine powder of silica having an average particle diameter of 8 microns was used instead of the crosslinked acrylic resin in the coating solution (A). Their properties, and the results of the printing tests conducted thereon are shown in TABLE 1 below.

COMPARATIVE EXAMPLE 4

The procedures of EXAMPLES 1 to 3 were repeated for the manufacture of coated plastic film, except that a fine polyethylene powder having an average particle diameter of 5 microns was used instead of the crosslinked acrylic resin in the coating solution (A). Its properties are shown in TABLE 1 below. As shown in TABLE 1, the coated plastic film obtained was highly inferior in slip properties, and caused blocking, and no printing test was conducted.

TABLE 1

| | Example 1 | Example 2 | Example 3 | Comparative Example 1 | Comparative Example 2 | Comparative Example 3 | Comparative Example 4 |
|---|---|---|---|---|---|---|---|
| Coating weight (g/m²) | 1.5 | 3.0 | 4.2 | 1.6 | 3.2 | 4.5 | 3.5 |
| Slip properties (Coefficient of dynamic friction) | 0.38 | 0.30 | 0.23 | 0.40 | 0.30 | 0.26 | 0.78 |
| Oxygen permeability (cc/m² · atm · day) | 16 | 7 | 5 | 18 | 7 | 5 | 21 |
| moisture permeability (g/m² · atm · day) | 7.2 | 6.3 | 4.5 | 7.0 | 6.1 | 5.0 | 7.1 |
| Results of printing test: degree of pinhole formation | Excellent | Excellent | Excellent | Unacceptable | Unacceptable | Unacceptable | — |
| Transparency | Excellent | Excellent | Excellent | Excellent | Excellent | Excellent | Excellent |
| Anti-blocking properties | Excellent | Excellent | Excellent | Excellent | Excellent | Excellent | Unaccceptable |

EXAMPLES 4 TO 6

Coronate L (product of Japan Polyurethane Co.) was applied by a gravure coater onto a surface of a biaxially oriented polyethylene telephtalate film having a thickness of 12 microns to form a layer having a unit weight of 0.2 g/m² thereon, and dried at 112° C. for 10 seconds. Then, a coating solution of the composition shown at B below was applied onto the film surface by Meyer bar coater, and dried at 105° C. for 15 seconds.

The coated surface of the film was, then, printed with Lamitop ink (polyurethane ink of Toyo Ink Co., Japan) by a gravure roll with a gravure plate having a cell depth of 5 microns, and the printed surface was dried at 110° C. for five seconds.

The properties of the coated plastic films thus obtained, and the results of the printing tests conducted thereon are shown in TABLE 2.

| (B) Coating solution | |
|---|---|
| Vinylidene chloride-vinyl chloride (90:10) copolymer resin | 100 parts by weight |
| Wax (m.p. 78° C.) | 1.5 parts by weight |
| Fine powder of crosslinked polystyrene resin of Sekisui Fine Chemical Co., Japan having an average particle diameter of 15 microns) | 0.15 parts by weight |
| Toluene | 260 parts by weight |
| Tetrahydrofurone | 260 parts by weight |

EXAMPLE 7

The procedures of EXAMPLES 4 to 6 were repeated for the manufacture of a coated film, except that a fine powder of a benzoguanamine-formaldehyde condensation product having an average particle diameter of 3 microns was used instead of the crosslinked polystyrene resin in the coating solution (B). Its properties, and the results of the printing test conducted thereon are shown in TABLE 2.

COMPARATIVE EXAMPLES 4 TO 6

The procedures of EXAMPLES 4 to 6 were repeated for the manufacture of coated plastic films, except that a fine powder of calcium carbonate having an average particle diameter of 3 microns was used instead of the crosslinked polystyrene resin in the coating solution (B). Their properties, and the results of the printing tests conducted thereon are shown in TABLE 2.

TABLE 2

|  | Example 4 | Example 5 | Example 6 | Example 7 | Comparative Example 4 | Comparative Example 5 | Comparative Example 6 |
| --- | --- | --- | --- | --- | --- | --- | --- |
| Coating weight (g/m$^2$) | 1.7 | 3.0 | 4.1 | 2.8 | 1.4 | 2.8 | 4.3 |
| Slip properties (coeffecient of dynamic friction) | 0.43 | 0.32 | 0.23 | 0.32 | 0.62 | 0.48 | 0.41 |
| Oxygen permeability (cc/m$^2$ · atm · day) | 14 | 6 | 4 | 6 | 17 | 6 | 4 |
| Moisture permeability (g/m$^2$ · atm · day) | 6.7 | 5.8 | 4.5 | 5.5 | 7.1 | 6.0 | 4.8 |
| Results of printing test: degree of pinhole formation | Excellent | Excellent | Excellent | Excellent | Unacceptable | Unacceptable | Unacceptable |
| Transparency | Excellent | Excellent | Excellent | Excellent | Excellent | Excellent | Acceptable |
| Anti-blocking properties | Excellent | Excellent | Excellent | Excellent | Excellent | Excellent | Excellent |

EXAMPLE 8

A mixed solution of EPS-451 (principal agent) and KH75 (curing agent) having a mixing ratio of 2:1 (product of Dainippon Inc & Chemical Co., Japan) was coated on the printed or coated surface of each of the coated plastic films obtained in EXAMPLES 1 to 3, and 4 to 7, and dried to form a coating having a solid weight of 1 g/m$^2$ thereon. Then, a low-density polyethylene was laminated on the coating of the film by extrusion to form a polyethylene layer having a thickness of 60 microns.

All the laminated films thus obtained showed a laminate strength of 550 to 600 g/25 min. which was entirely satisfactory for practical use.

EXAMPLE 9

A regenerated cellulose film having a unit weight of 32.1 g/m$^2$ was dipped in the coating solution (A) used in EXAMPLES 1 to 3. The film was withdrawn from the solution, while both surfaces thereof were being rolled by Meyer bar, and dried at 105° C. for 10 seconds. The coated plastic film thus obtained had a unit weight of 35.5 g/m$^2$.

The coated film was, then printed as described in connection with EXAMPLES 1 to 3. The properties of the coated film, and the results of the printing test are shown in TABLE 3.

TABLE 3

|  | Example 9 | Comparative Example 7 |
| --- | --- | --- |
| Coating weight (g/m$^2$) | 3.4 | 3.3 |
| Slip properties (coefficient of dynamic friction) | 0.35 | 0.36 |
| Oxygen permeability (cc/m$^2$ · atm · day) | 5 | 5 |
| Moisture permeability (g/m$^2$ · atm · day) | 8 | 8 |
| Results of printing test: degree of pinhole formation | Excellent | Unacceptable |
| Transparency | Excellent | Excellent |
| Anti-blocking properties | Excellent | Excellent |

COMPARATIVE EXAMPLE 7

A regenerated cellulose film having a unit weight of 32.0 g/m$^2$ was coated with the coating solution used in COMPARATIVE EXAMPLES 1 to 3, in accordance with the procedures described in EXAMPLE 9. The coated plastic film thus obtained had a unit weight of 35.3 g/m$^2$. It was printed as in COMPARATIVE EXAMPLES 1 to 3.

The properties of the coated plastic film, and the results of the printing test are shown in TABLE 3 above.

What is claimed is:

1. A coated plastic film possessing good printability, slip properties, oxygen and moisture barrier properties and transparency, comprising a plastic film and a coating thereon, said coating including a thermoplastic base resin and a crosslinked, electrostatically neutral synthetic resin in an amount of from 0.01–2 parts by weight per 100 parts by weight of said thermoplastic resin, said synthetic resin having a softening temperature of above 100° C. and an average particle diameter of 1–20 microns.

2. The coated plastic film according to claim 1, wherein the synthetic resin is a crosslinked acrylic copolymer, a crosslinked styrene copolymer or a crosslinked vinyl chloride copolymer.

3. The coated plastic film according to claim 1, wherein the synthetic resin is a benzoguanamine-formaldehyde condensate.

4. The coated plastic film according to claim 1, wherein the thermoplastic resin is a vinylidene copolymer, an acrylic copolymer, a vinyl acetate copolymer or a mixture thereof.

5. The coated plastic film according to claim 1, wherein the plastic film is a polypropylene film, a polyester film or a cellulosic resin film.

6. The coated plastic film according to claim 1, wherein the synthetic resin is a crosslinked copolymer.

7. The coated plastic film according to claim 1, wherein the plastic film is a polypropylene film, a polyester film or a cellulosic resin film, the thermoplastic resin is a vinylidene copolymer, an acrylic copolymer, a vinyl acetate copolymer or a mixture thereof and the synthetic resin is a crosslinked acrylic copolymer, a crosslinked styrene copolymer, a crosslinked vinyl chloride copolymer or a benzoguanamine-formaldehyde condensate.

8. A method of producing a coated plastic film having good printability, slip properties, oxygen and moisture barrier properties and transparency which comprises:

dissolving a thermoplastic resin in a solvent liquid;

dispersing in said solution 0.01-2 parts by weight per 100 parts of said thermoplastic resin of a crosslinked, electrostatically neutral synthetic resin having a softening temperature of about 100° C. and an average particle size of 1-20 microns and being substantially insoluble in said solvent liquid;

coating the surface of a plastic film with said dispersion; and thereafter drying said coated plastic film.

9. The method according to claim 8 which further comprises:

treating the surface of the plastic film prior to the coating step so as to improve the adhesion of the coating thereon.

10. The method of claim 9, wherein the surface of the plastic film is treated by corona discharge, high frequency, flame or chromic acid.

11. The method according to claim 9 which further comprises adding an adhesion improving agent.

12. The method according to claim 8, wherein the synthetic resin is a crosslinked acrylic copolymer, a crosslinked styrene copolymer or a crosslinked vinylchloride copolymer.

13. The method of claim 8, wherein the synthetic resin is a benzoguanamine-formaldehyde condensate.

14. The method according to claim 8, wherein the thermoplastic resin is a vinylidene copolymer, an acrylic copolymer, a vinyl acetate copolymer or a mixture thereof.

15. The method according to claim 8, wherein the plastic film is a polypropylene film, a polyester film or a cellulosic resin film.

16. The method according to claim 8, wherein the synthetic resin is a crosslinked copolymer.

17. The method according to claim 8, wherein the plastic film is a copolymer.

* * * * *